United States Patent [19]

Nusser

[11] Patent Number: 5,612,464
[45] Date of Patent: Mar. 18, 1997

[54] DISAZO DYES CONTAINING A DIFLUOROPYRIMIDINYL REACTIVE GROUP

[75] Inventor: Rainer Nusser, Neuenburg, Germany

[73] Assignee: Clariant Fiance (BVI) Limited, Virgin Islands (Br.)

[21] Appl. No.: 643,137

[22] Filed: May 2, 1996

[30] Foreign Application Priority Data

May 5, 1995 [GB] United Kingdom .................... 9509159

[51] Int. Cl.⁶ .......................... C09B 62/25; C09B 67/22; D06P 1/382
[52] U.S. Cl. ................. 534/637; 534/827; 8/549
[58] Field of Search ................... 534/637; 8/549

[56] References Cited

U.S. PATENT DOCUMENTS

| | | | |
|---|---|---|---|
| 3,669,951 | 6/1972 | Bien et al. ............ | 534/638 X |
| 5,436,324 | 7/1995 | Reddig et al. ............ | 534/637 X |

FOREIGN PATENT DOCUMENTS

| | | | |
|---|---|---|---|
| 0139248 | 9/1984 | European Pat. Off. ............ | 534/618 |
| 1221621 | 5/1959 | France ............ | 534/637 |
| 466457 | 1/1969 | Switzerland ............ | 534/637 |
| 2269596 | 2/1994 | United Kingdom ............ | 534/637 |

*Primary Examiner*—Fiona T. Powers
*Attorney, Agent, or Firm*—Robert S. Honor; Carl W. Battle; Gabriel Lopez

[57] ABSTRACT

The invention is concerned with compounds according to the formula

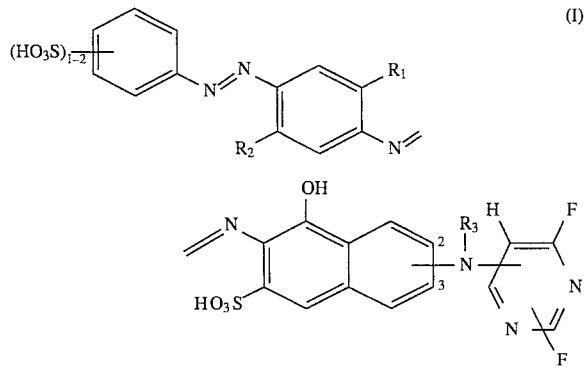

and their salts
wherein
R₁ represents hydrogen or —SO₃H,
R₂ represents hydrogen, methyl, —NHCONH₂ or —NHCOCH₃ and,
R₃ represents hydrogen, C₁₋₄alkyl, preferably methyl or ethyl, or C₁₋₄alkyl substituted with CN, OH, Cl, F or —SO₃H.

These compounds are useful as fiber-reactive dyestuffs in dyeing and printing hydroxy-group-containing and nitrogen-containing organic substrates.

8 Claims, No Drawings

DISAZO DYES CONTAINING A DIFLUOROPYRIMIDINYL REACTIVE GROUP

This invention relates to disazo-dyestuffs, methods for their preparation and their use as fibre-reactive dyestuffs in dyeing and printing processes.

According to the invention there is provided compounds according to the formula (I)

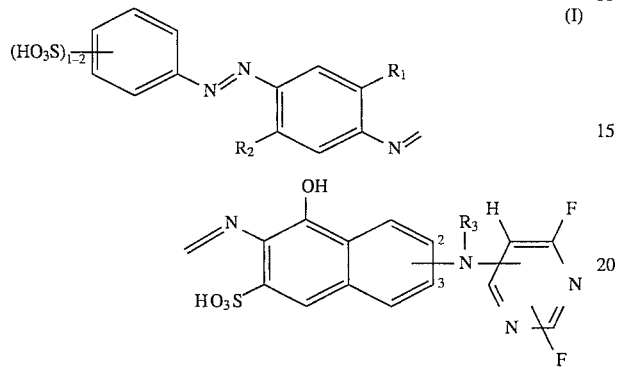

and their salts
wherein
R$_1$ represents hydrogen or —SO$_3$H,
R$_2$ represents hydrogen, methyl, —NHCONH$_2$ or —NHCOCH$_3$ and,
R$_3$ represents hydrogen, C$_{1-4}$alkyl, preferably methyl or ethyl, or C$_{1-4}$alkyl substituted with CN, OH, Cl, F or —SO$_3$H.

A more preferred compound according to formula I is represented by the formula

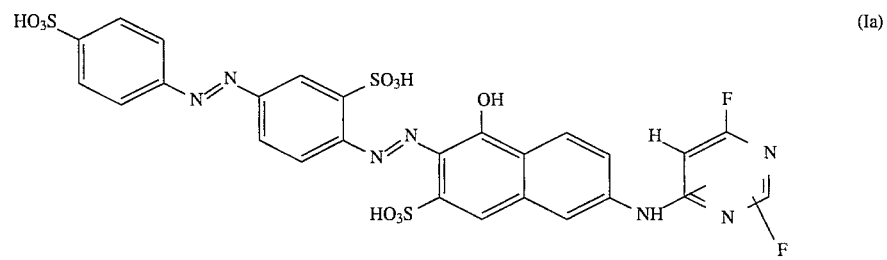

Compounds according to formula I may be formed in free acid or salt form.

When the compound of formula I is in salt form the cations associated with the sulfo groups is not critical and may be any one of those non-chromophoric cations conventional in the field of fibre-reactive dyes provided that the corresponding salts are water-soluble.

Examples of such cations are alkali metal cations and unsubstituted ammonium cations, e.g. lithium, sodium, potassium, ammonium, mono-, di-, tri- and tetra-methylammonium, triethylammonium, and mono-, di-, and tri-ethanolammonium. The preferred cations are the alkali metal cations and the ammonium cation, with the sodium cation being the most preferred.

In a compound of formula I the cations of the sulfo groups can be the same or different, e.g., they can be a mixture of the above-mentioned cations meaning that the compound of formula I can be in a mixed salt form.

The invention provides in another of its aspects a method of forming compounds of formula I, their salts or mixtures thereof which comprises reacting a compound according to the formula

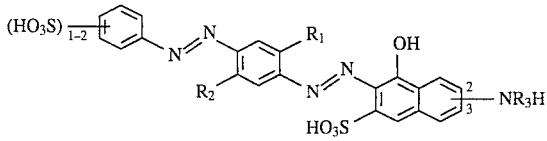

with a compound of the general formula

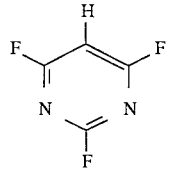

This condensation reaction proceeds according to a known method and is preferably carried out at a temperature of from 20°–50° C., more preferably 30°–40° C. and at a pH of 4–5.

An alternative method of preparation of the compounds of formula I is provided by reacting a compound having the formula

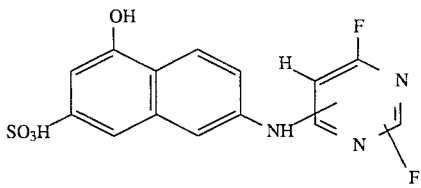

with a compound having the formula

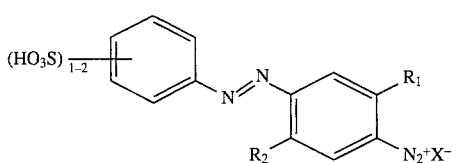

wherein X' is chloride or bromide ion, preferably chloride.

This coupling reaction may be carried out according to known methods and is preferably carried out at a temperature of 0°–10° C., more preferably 0°–5° C. and at a pH of from 0 to 2, preferably 0 to 1.

In each of the syntheses referred to above, the starting materials are either readily available or can be synthesized from commonly available raw materials.

The compounds of formula I may be isolated in accordance with known methods, e.g. by conventional salting out with alkali metal salts, filtering and drying optionally in vacuo and at slightly elevated temperature.

Depending on reaction and isolation conditions, a compound of formula I may be formed in free-acid or preferably salt form or even mixed salt form containing, e.g., one or more of the above-mentioned cations.

Compounds of the formula I may be converted from free-acid form to a salt form or mixture of salt forms or vice versa or from one salt form to another by conventional means. The compounds of formula I, their salts and mixtures thereof are reactive dyestuffs. They are suitable for dyeing and printing hydroxy-group containing or nitrogen-containing substrates. They may produce dyeings or prints of a red shade.

Accordingly in another aspect of the invention there is provided a process of dyeing or printing hydroxy-group-containing or nitrogen-containing organic substrates wherein the dyeing or printing is performed with compounds as hereinabove described, their salts or mixtures thereof.

Preferred substrates which may be mentioned are leather and fibrous materials which consists of or contain natural or synthetic polyamides and in particular natural or regenerated cellulose such as cotton, viscose or rayon staple fibre. The substrate which is usually preferred is textile material consisting of or containing cotton.

The compounds of formula I, their salts or mixtures thereof may be employed in dye baths or in printing pastes according to all the dyeing or printing processes which are common in the field of reactive dyestuffs. Dyeing is preferably effected by the Exhaust Process from an aqueous medium and at a temperature range of 30°–80° C., more preferably 50°–60° C. and a salt content of from 10–80 g/l, preferably 10–50 g/l, more preferably 10–30 g/l. A goods-to-liquor ratio (that is, substrate to liquor ratio) is from 4:1 to 30:1, preferably 6:1 to 20:1.

In yet another aspect of the invention there is provided the use of compounds hereinabove defined, their salts or mixtures thereof in dyeing or printing substrates as hereinabove described.

The compounds of this invention and their salts have good compatibility with known fibre-reactive dyestuffs. Accordingly, the compounds of the invention, their salts or mixtures thereof may be used individually in a dyeing or printing process or as a component in a combination dyeing or printing composition comprising other reactive dyestuffs of the same class, that is, reactive dyes which possess comparable dyeing properties, e.g., fastness properties and the extent of ability to exhaust from a dyebath on to a substrate. In particular, the dyestuffs of the invention may be employed in a trichromatic dyebath in conjunction with certain suitable yellow and blue dyestuffs having the same or other suitable reactive group in suitable proportions to produce a wide range of shades. The combination dyeings or prints obtained have fastness properties which are comparable to those of dyeing and prints made with individual dyestuffs according to the invention.

The compounds of formula I, their salts or mixtures thereof give good exhaust and fixation yields when used as dyestuffs. Moreover, any unfixed dyestuff is easily washed off the substrates. The dyeings and prints formed exhibit good lights fastness and good wet fastness properties such as wash, water, sea water and sweat fastness. They also exhibit good resistance to oxidizing agents such as chlorinated water, hypochlorite bleach, peroxide bleach and perborate-containing washing detergents.

The following examples are illustrative of the invention. In the examples, all parts and percentages are expressed by weight unless indicated to the contrary and all temperatures are given in degrees celsius.

EXAMPLE 1

47.8 parts of 2-amino-5-hydroxynaphtalene-7-sulphonic acid were stirred into 500 parts of water at 25° C. and were dissolved by the addition of 22 parts of a 30% by weight solution of sodium hydroxide. To this solution was added 26.8 parts of 2,4,6-trifluoropyrimidine dropwise over a 30 minute period. At the same time a 20% of sodium carbonate solution was added to this mixture continuously in order to maintain the pH of the mixture at 4–5. The reaction temperature was increased to 40°–45° C. The end point of the reaction was determined using chromatographic techniques.

The resultant suspension was cooled to 20°–25° C. and poured onto a diazonium salt solution which was formed of 71.5 parts of 4-amino-1,1'-azobenzene-3,4'-disulfonic acid and 50 parts by volume of 4N sodium nitrite solution at 0°–5° C. and a pH of 1. The resultant coupling reaction mixture was maintained of a pH of 7–7.5 by continuously adding 20% sodium carbonate solution. The disazo compound thus formed was salted-out using conventional methods, filtered and dried at 50° C. under vacuum. The product had the formula

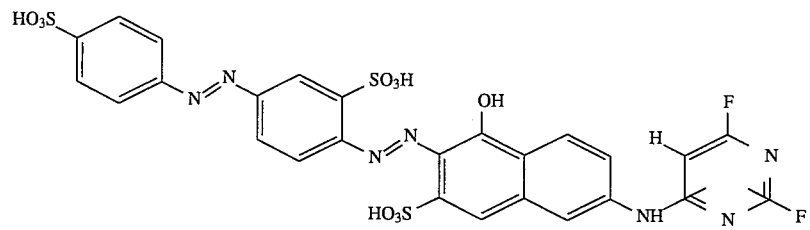

λmax 515 nm in H$_2$O.

This product dyed cotton to a red shade. The resultant dyeing displayed excellent light and wet fastness properties and was resistant towards oxidative influences.

EXAMPLE 2

A solution of 28.1 parts of 2-acetylamino-8-hydroxynaphthalene-6-sulfonic acid in 200 parts of water at 25° C. were mixed with a diazonium salt solution formed at 0°–5° C. and a pH of 1 from a mixture of 35.8 parts of 4-amino-1,1'-azobenzene-3,4'-disulfonic acid and 25 parts by volume of 4N sodium nitrite solution.

The resultant coupling reaction mixture was maintained at a pH of 8–8.5 by the continuous addition of a 20% sodium carbonate solution. At the end of the reaction the product obtained was filtered and dried by suction. The still damp residue after suction filtration was dissolved in 300 parts of 4% by weight solution of sodium hydroxide and the resultant solution was heated to 90°–100° C. until saponification of the acetyl group was complete as determined by thin layer chromatography. The solution of the compound thus obtained having the formula

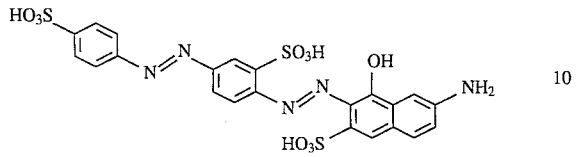

was cooled to 20° C. and by adding 30% hydrochloric acid the pH was adjusted to 5–6. At this pH 26.8 parts of 2,4,6-trifluoropyrimidine were added dropwise over a 30 minute period. The pH of this solution was maintained by the continuous addition of 20% sodium carbonate solution and the temperature of the reaction mixture was maintained at 40°–45° C.

Upon completion of the reaction the resultant dyestuff was salted-out, filtered and dried at 50° C. under vacuum. The resultant dyestuff had the following formula

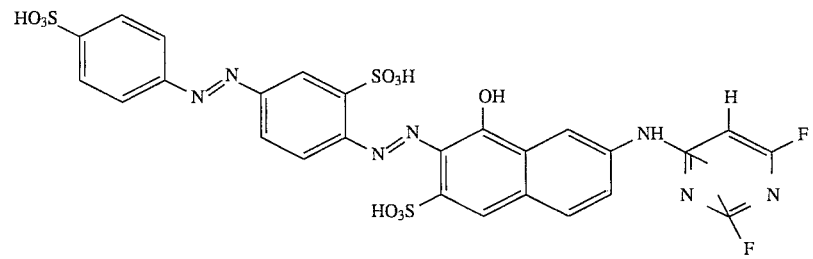

$\lambda$ max 533 nm in $H_2O$.

This dyestuff dyed and printed cotton to a red shade. Dyeings and prints thus obtained displayed excellent light and wet fastness properties and were stable to oxidative influences.

EXAMPLES 3–15

Table 1 discloses several dyestuffs which were formed according to methods analogous to those described in Examples 1 and 2 and employing corresponding starting materials. In all cases, the dyestuffs obtained dyed or printed cotton to a red shade and dyeings and prints thus obtained displayed excellent light and wet fastness and were stable to oxidative influences.

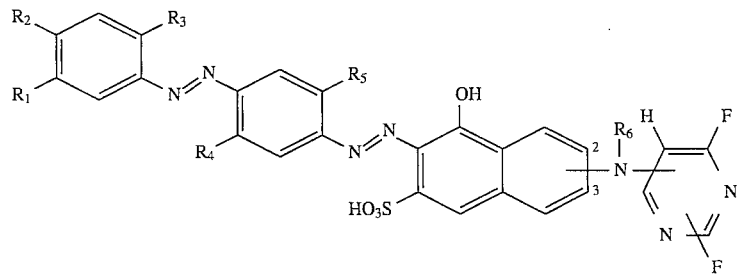

TABLE 1

| Ex. | $R_1$ | $R_2$ | $R_3$ | $R_4$ | $R_5$ | $R_6$ | Pos. —NH— | $\lambda_{max}$ nm in $H_2O$ |
|---|---|---|---|---|---|---|---|---|
| 3 | $SO_3H$ | H | $SO_3H$ | H | H | H | 3 | 523 |
| 4 | H | $SO_3H$ | $SO_3H$ | H | H | H | 3 | 522 |
| 5 | $SO_3H$ | H | $SO_3H$ | —NHCONH$_2$ | H | H | 3 | 526 |
| 6 | $SO_3H$ | H | $SO_3H$ | —NHCONH$_2$ | $SO_3H$ | H | 3 | 525 |
| 7 | H | $SO_3H$ | H | —NHCONH$_2$ | $SO_3H$ | H | 3 | 518 |
| 8 | $SO_3H$ | H | $SO_3H$ | H | H | H | 2 | 537 |
| 9 | H | $SO_3H$ | $SO_3H$ | H | H | H | 2 | 539 |
| 10 | $SO_3H$ | H | $SO_3H$ | $CH_3$ | H | H | 3 | 539 |
| 11 | H | $SO_3H$ | $SO_3H$ | $CH_3$ | H | H | 3 | 528 |
| 12 | H | $SO_3H$ | H | H | $SO_3H$ | $CH_3$ | 3 | 516 |
| 13 | $SO_3H$ | H | $SO_3H$ | H | H | $CH_3$ | 3 | 524 |
| 14 | H | $SO_3H$ | $SO_3H$ | H | H | $CH_3$ | 3 | 522 |
| 15 | H | $SO_3H$ | H | H | $SO_3H$ | $CH_3$ | 2 | 534 |

APPLICATION EXAMPLE A 0.3 Part of the dyestuff of Example 1 was dissolved in 100 parts of demineralized water and 3 g Glauber's salt (calcined) was added. The dyebath was heated to 50°, then 10 parts of cotton fabric (bleached) were added. After 30 minutes at 50°, 0.4 part of sodium carbonate (calcined) was added to the bath. During the addition of sodium carbonate the temperature was kept at 50°. Subsequently, the dyebath was heated to 60°, and dyeing was effected for a further one hour at 60°.

The dyed fabric was then rinsed with running cold water for 3 minutes and afterwards with running hot water for a further 3 minutes. The dyeing was washed at the boil for 15 minutes in 500 parts of demineralized water in the presence of 0.25 part of Marseille soaps. After being rinsed with running hot water (for 3 minutes) and centrifuged, the dyeing was dried in a cabinet dryer at about 70°. A red cotton dyeing was obtained showing good fastness properties, and particularly high wet fastness properties, which is stable towards oxidative influences.

APPLICATION EXAMPLE B

To a dyebath containing in 100 parts of demineralized water and 3 g Glauber's salt (calcined) 10 parts of cotton fabric (bleached) were added. The bath was heated to 50° within 10 minutes, and 0.5 part of the dyestuff of Example 1 was added. After a further 30 minutes at 50°, 1 part of sodium carbonate (calcined) was added. The dyebath was then heated to 60° and dyeing was continued at 60° for a further 45 minutes.

The dyed fabric was rinsed with running cold and then hot water and washed at the boil according to the method of application Example A. After rinsing and drying a red cotton dyeing was obtained which had the same good fastness properties as indicated in Application Example A.

Similarly, the dyestuffs of Examples 2–15 or mixtures of the exemplified dyestuffs were employed to dye cotton in accordance with the method described in Application Example A or B. The cotton dyeings thus obtained were red and show good fastness properties.

APPLICATION EXAMPLE C

A printing paste consisting of

| | |
|---|---|
| 40 parts of the dyestuff of Example 1 | |
| 100 parts of urea | |
| 350 parts of water | |
| 500 parts of a 4% sodium alginate thickener and | |
| 10 parts of sodium bicarbonate | |
| 1000 parts in all | | was applied to cotton fabric in accordance with conventional printing methods.

The printed fabric was dried and fixed in steam at 102°–104° for 4–8 minutes. It was rinsed in cold and then hot water, washed at the boil (according to the method described in Application Example A) and dried. An red print was obtained which has good general fastness properties.

Similarly, the dyestuffs of Examples 2 to 15 or mixtures of the exemplified dyestuffs were employed to print cotton in accordance with the method given in Application Example C. All prints obtained were red and show good fastness properties.

I claim:

1. A compound of the formula

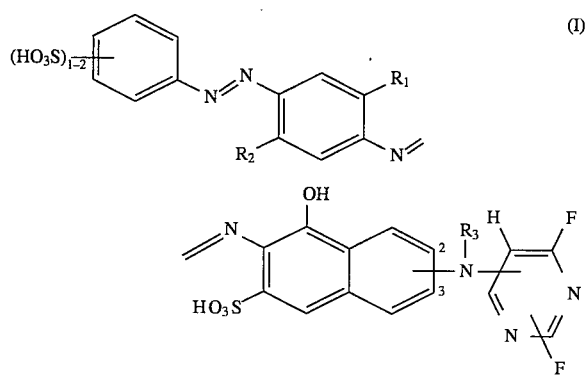

wherein $R_1$ represents hydrogen or —$SO_3H$;

$R_2$ represents hydrogen, methyl, —NHCONH$_2$, or —NHCOCH$_3$; and $R_3$ represents hydrogen, $C_{1-4}$alkyl, or substituted $C_{1-4}$alkyl; or a salt thereof.

2. A compound of claim 1 or a salt thereof wherein $R_3$ represents hydrogen, methyl, ethyl, or $C_{1-4}$alkyl substituted with OH, CN, Cl, F, or —$SO_3H$.

3. A compound of claim 1 or 2 of the formula

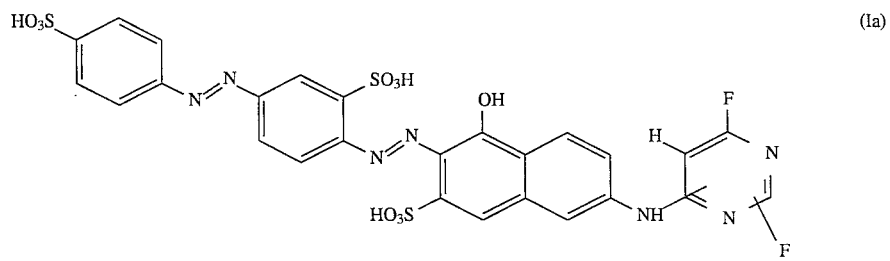

(Ia)

4. A compound of claim 1 of the formula:

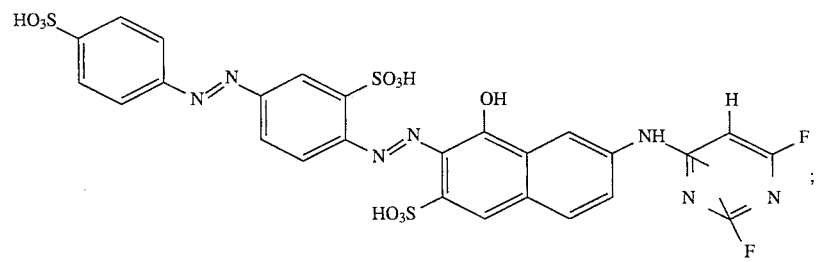

or of the formula:

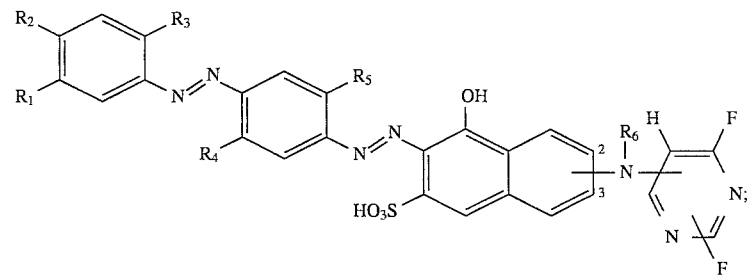

wherein the substituents are as follows:

| $R_1$ | $R_2$ | $R_3$ | $R_4$ | $R_5$ | $R_6$ | Pos. —$NR_6$— |
|---|---|---|---|---|---|---|
| $SO_3H$ | H | $SO_3$ | H | H | H | 3 |
| H | $SO_3H$ | $SO_3H$ | H | H | H | 3 |
| $SO_3H$ | H | $SO_3H$ | —$NHCONH_2$ | H | H | 3 |
| $SO_3H$ | H | $SO_3H$ | —$NHCONH_2$ | $SO_3H$ | H | 3 |
| H | $SO_3H$ | H | —$NHCONH_2$ | $SO_3H$ | H | 3 |
| $SO_3H$ | H | $SO_3H$ | H | H | H | 2 |
| H | $SO_3H$ | $SO_3H$ | H | H | H | 2 |
| $SO_3H$ | H | $SO_3H$ | $CH_3$ | H | H | 3 |
| H | $SO_3H$ | $SO_3H$ | $CH_3$ | H | H | 3 |
| H | $SO_3H$ | H | H | $SO_3H$ | $CH_3$ | 3 |
| $SO_3H$ | H | $SO_3H$ | H | H | $CH_3$ | 3 |
| H | $SO_3H$ | $SO_3H$ | H | H | $CH_3$ | 3 |
| H | $SO_3H$ | H | H | $SO_3H$ | $CH_3$ | 2 |

5. A method of forming a compound of formula 1, a salt thereof or a mixture thereof which comprises reacting a compound of the formula

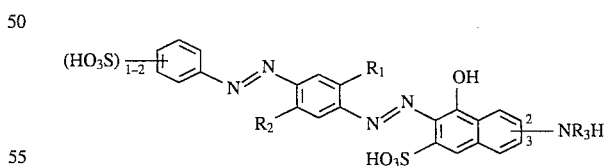

with a compound of the formula

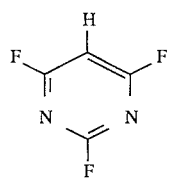

6. A process of dyeing or printing hydroxy-group-containing or nitrogen-containing organic substrates which comprises applying thereto a compound of claim 1, a salt thereof, or a mixture thereof.

7. Hydroxy-group-containing or nitrogen-containing organic substrates dyed or printed with a compound of claim 1, a salt thereof, or a mixture thereof.

8. Textile material of claim 7 consisting of cotton.

* * * * *